United States Patent [19]

Ishimura et al.

[11] 4,367,318

[45] Jan. 4, 1983

[54] EPOXY RESIN COMPOSITION

[75] Inventors: Hidekazu Ishimura, Fujinomiya; Hiroshi Komoto, Fuji; Isao Kai, Aichi, all of Japan

[73] Assignees: Asahi Yakizai Kogyo Co., Miyazaki; Asahi Kasei Kogyo Kabushiki Kaisha, Osaka, both of Japan

[21] Appl. No.: 124,896

[22] Filed: Feb. 26, 1980

Related U.S. Application Data

[63] Continuation-in-part of Ser. No. 939,936, Sep. 6, 1978, abandoned.

[30] Foreign Application Priority Data

Sep. 8, 1977 [JP] Japan .................................. 52/108202
Sep. 7, 1978 [FR] France .................................. 78 25761
Sep. 8, 1978 [DE] Fed. Rep. of Germany ....... 2839221

[51] Int. Cl.³ ....................... C08L 63/00; C08L 61/10
[52] U.S. Cl. ..................................... 525/481; 525/934
[58] Field of Search ......................... 260/831; 525/481

[56] References Cited

U.S. PATENT DOCUMENTS

| | | | |
|---|---|---|---|
| 2,521,911 | 9/1950 | Greenlee | 260/831 |
| 2,521,912 | 9/1950 | Greenlee | 260/831 |
| 3,663,354 | 5/1972 | Ueno | 260/831 |
| 3,714,121 | 1/1973 | Kobel | 260/831 |
| 3,780,132 | 12/1973 | Lohr | 260/831 |
| 3,932,144 | 1/1976 | Matsubara | 260/831 |
| 3,936,342 | 2/1976 | Matsubara | 260/831 |
| 3,960,979 | 6/1976 | Khanna | 260/831 |
| 3,993,841 | 11/1976 | Matsubara | 260/831 |
| 4,120,847 | 10/1978 | Culbertson | 260/831 |

OTHER PUBLICATIONS

Detroit Society, for Paint Technology; Powder Coating, J. of Paint Technology, vol. 49, No. 565 Feb. 1972. pp. 30–37.

*Primary Examiner*—Paul Lieberman
*Attorney, Agent, or Firm*—Sughrue, Mion, Zinn, MacPeak and Seas

[57] ABSTRACT

An epoxy resin composition comprising
(1) about 20 to about 80% by weight of a solid epoxy resin, and
(2) about 80 to about 20% by weight of a solid resole-type phenolic resin having a softening point of about 70° to about 90° C., a gel time at 150° C. of at least about 80 seconds and a methylol index of about 25 to about 45, said phenolic resin being a condensation product of 1 mol of a phenol with 1 to about 4 mols of an aldehyde.

22 Claims, No Drawings

EPOXY RESIN COMPOSITION

This application is a continuation-in-part application of Ser. No. 939,936, filed Sept. 6, 1978, now abandoned.

BACKGROUND OF THE INVENTION

1. Field of the Invention

This invention relates to an epoxy resin composition capable of being rapidly cured by heating and providing a coated film having good adhesion and impact strength and excellent chemical resistance.

2. Description of the Prior Art

It is known to use an epoxy resin composition as a powder paint. The cured coated films obtained with conventional epoxy resin compositions have low adhesion, low impact strength and low flexural strength and their resistance to strong acids, strong alkalies and highly polar solvents is also low.

It is also known that a solvent-based phenol-epoxy resin paint, i.e., a paint obtained by dissolving a resole-type phenolic resin as a solution and a solid bisphenol A-type epoxy resin in a solvent and then mixing them, can be used as a lining or insulation varnish for tanks, drums and pipes used in handling foodstuffs in fields which require both chemical resistance and thermal stability. The mixture is baked at a high temperature to form a coated film while the solvent is volatilized. Volatilization of a large quantity of solvent occurs when this type of paint is used to form a film and this leads to environmental pollution. Furthermore, since a resole-type phenolic resin is normally liquid, this resin cannot be formed into a powder paint. An attempt has been made to produce a solid resole-type phenolic resin using special techniques and to prepare a powdery phenol-epoxy resin paint therefrom. However, the resulting paint is not entirely satisfactory for practical purposes because baking at 200° C. for as long as 20 minutes is required.

SUMMARY OF THE INVENTION

Extensive investigations have now been made in order to remove the defects of conventional epoxy resin compositions, and to obtain a powdery epoxy resin composition capable of being cured rapidly by heating and providing a coated film having superior adhesion, impact strength and chemical resistance. These investigations have led to the discovery that such an epoxy resin composition can be obtained by combining a solid resole-type phenolic resin having certain specific properties and a solid epoxy resin.

Thus, the present invention provides an epoxy resin composition comprising (1) about 20 to about 80% by weight of a solid epoxy resin composition, and (2) about 80 to about 20% by weight of a solid resole-type phenolic resin having a softening point of about 70° to about 90° C., a gel time at 150° C. of at least about 80 seconds and a methylol index of about 25 to about 45, said phenolic resin being a condensation product of 1 mol of a phenol with 1 to about 4 mols of an aldehyde.

DETAILED DESCRIPTION OF THE INVENTION

The solid resole-type phenolic resin used in this invention should have a softening point of about 70 to about 90° C. and a gel time at 150° C. of at least about 80 seconds, when measured by the methods in accordance with JIS K-6910 and K-5400, respectively. If the softening temperature is lower than about 70° C., the coated film prepared from the resin composition has poor anti-blocking property. On the other hand, a solid resole-type phenolic resin having a softening point of more than about 90° C. is unsuitable because of the low compatibility of the solid resole-type phenolic resin with the epoxy resin.

A solid resole-type phenolic resin having a gel time shorter than about 80 seconds has poor compatibility with the epoxy resin, and an epoxy resin composition prepared using such a solid resole-type phenolic resin has poor flowability and does not form a good quality coating. A solid resole-type phenolic resin with a gel time up to about 500 seconds, preferably up to about 150 seconds, more particularly up to about 100 seconds, can be suitably employed. When a resole-type phenolic resin having a gel time at 150° C. of more than about 500 seconds is used, a powder paint obtained by mixing such a resole-type phenolic resin with the epoxy resin must be baked for a long period of time at a temperature of at least about 250° C.

The methylol index, as referred to in this invention, denotes the ratio in percent of the intensity of the characteristic absorption of the methylol group at 1,000 to 1,050 $cm^{-1}$ to that of the characteristic absorption at 1,600 $cm^{-1}$ of the benzene ring in the infrared absorption spectrum of a resole-type phenolic resin. When the methylol index of the resole-type phenolic resin is smaller than about 25, the reactivity of the epoxy resin composition prepared therefrom is low, and long periods of time are required for curing the epoxy resin composition. Furthermore, the epoxy resin composition thus-prepared has poor flowability and does not provide a good quality coated film. If the methylol index is larger than about 45, the resole-type phenolic resin tends to gel when mixed with the epoxy resin. Furthermore, the compatibility of the resole-type phenolic resin with the epoxy resin is poor, and a good quality coated film cannot be obtained.

The solid resole-type phenolic resin used in this invention can be prepared, for example, by condensing 1 mol of a phenol with 1 to about 4 mols, preferably 1.2 mol to 2 mols, of an aldehyde in the presence of a basic catalyst to adjust the softening point to about 70° to about 90° C., the gel time at 150° C. to at least about 80 seconds, and the methylol index to about 25 to about 45, preferably 30 to 40. When less than 1 mol of an aldehyde is reacted per mol of a phenol, a solid resole-type phenolic resin having a softening point of about 70° to about 90° C. cannot be obtained without washing the resulting phenolic resin with water. A gelated product is obtained. When the phenolic resin is washed with water to adjust the softening point within the range described above, however, the methylol index of the phenolic resin decreases to less than 25. On the other hand, when more than about 4 mols of an aldehyde is reacted per mol of a phenol, the methylol index of the resulting phenolic resin is more than 45.

Examples of suitable phenols which can be used in this reaction are phenol, phenols substituted with an alkyl group having 1 to 6 carbon atoms, such as cresol, propylphenol, butylphenol and tertiary-butylphenol (especially, m-substituted phenols), bicyclic phenols, such as bisphenol A, bisphenol S and bisphenol F, and dihydric phenols, such as resorcinol. These phenols can be used either individually or as mixtures of two or more thereof. Phenol, cresol and bisphenol A are especially preferred in this invention.

Examples of suitable aldehydes are formaldehyde, paraformaldehyde, furfural, acetaldehyde, butyraldehyde, and glyoxal. Formaldehyde in the form of an aqueous solution thereof or paraformaldehyde is preferred. These aldehydes can be used either individually or as mixture of two or more thereof.

Examples of suitable basic catalysts which can be used in the condensation of the phenol with the aldehyde include inorganic bases, such as the hydroxides, carbonates, basic carbonates, oxides and organic weak acid (e.g., naphthenic acid, acetic acid, formic acid, benzoic acid, etc.) salts of alkali metals (e.g., Li, Na, K, etc.) or alkaline earth or similar metals (e.g., Mg, Ca, Zn, Mn, Pb, etc.), ammonia solutions, primary amines and secondary amines. Specific examples of suitable catalysts include hydroxides, such as sodium hydroxide, etc., carbonates, such as sodium carbonate, etc., oxides, such as calcium oxide, magnesium oxide, etc., organic weak acid salts, such as magnesium naphthenate, sodium bicarbonate, etc., primary amines, such as monomethylamine, monoethylamine, ethylenediamine, diethylenediamine, diethylenetriamine, aniline, etc., and secondary amines, such as dimethylamine, diethylamine, etc. These basic catalysts can be used either individually or as a mixture of two or more thereof. A suitable amount of the basic catalyst ranges from about 0.1 to 10% by weight based on the total weight of the phenol used.

In the production of the resole-type phenolic resin, it is important for the solid condensation product to be produced at room temperature (e.g., about 20° to 30° C.), and during or after the production, to adjust the softening point to about 70° to about 90° C., the gel time at 150° C., to at least about 80 seconds, and the methylol index to about 25 to about 45, preferably 30 to 40.

Some methods are already known for producing solid resole-type phenolic resins (for example, as described in Japanese Patent Application (OPI) Nos. 3340/72, 46521/75 and 62857/76 (The term "OPI" as used herein refers to a "published unexamined Japanese patent application"), and Japanese Patent Publication No. 12658/77. Solid resole-type phenolic resins obtained by these known methods do not possess the softening point, gel time and methylol index that are required in this invention.

The solid resole-type phenolic resin which can be used in the present invention can be produced in the following manner. Initially, a solid resole-type phenolic resin having a volatiles content of about 2 to about 15% by weight at 70° C. is prepared by condensing a phenol with an aldehyde in the mol ratio set forth above using any of the known methods described above, a tubular continuous dehydration method under reduced pressure, a solidification method involving a salting-out separation of a resin from water by adding, e.g., sodium chloride to an aqueous solution containing the resin, etc. The thus prepared solid resole-type phenolic resin is, however, not applicable for the present invention because the solid resole-type phenolic resin has a volatiles content of more than about 2% by weight, which gives rise to problems, such as blocking. Therefore, the solid resole-type phenolic resin is subsequently maintained at room temperature to about 50° C. for 10 to 60 seconds, and then at about 50 to about 130° C. for 10 to 60 seconds. Gases which are generated during this time are removed by suitable means, and then the product is rapidly cooled to room temperature. Thus, a solid resole-type phenolic resin having the properties described above can be obtained. On the contrary, when the solid resole-type phenolic resin obtained by the first step is maintained at room temperature for less than 10 seconds and then at 50° C. for less than 10 seconds, the resulting resin has a softening point of lower than 70° C. which gives rise to problems, such as blocking during storage, and when the solid resole-type phenolic resin is maintained at 50° C. for more than 60 secondsand then at 130° C. for more than 60 seconds, the resulting resin has a gel time of less than 80 seconds.

According to a preferred method of producing such a solid resole-type phenolic resin, a phenol resin is first produced using an optional means as described above, and then the phenol resin is put into a hopper of a conventional monoaxial or biaxial extruder. The temperature of the cylinder is adjusted to room temperature to about 50° C. at the feed inlet, and about 60° to about 130° C. at the outlet. Holes, e.g., about 10 to 100, with the desired diameter (3 to 5 mm) are provided at the discharge metal plate. The phenol resin is continuously extruded, and in the meantime, cooled and cut. Alternatively, a screw extruding mechanism is provided in the transfer path to cut the resin. Thus, a phenolic resin in the form of noodles or rods having a length of about 2 to 20 mm is obtained.

Alternatively, a resole-type phenolic resin having a volatiles content of about 10% by weight is extruded through a discharge opening of an extruder having a diameter of 100 mm and a length/diameter (L/D) ratio of 15 to 50 while discharging gases generated to a reduced pressure area in the middle of the extruder.

The shape of the solid resole-type phenolic resin used in this invention is not limited, but to be able to mix the solid resole-type phenolic resin smoothly with the epoxy resin, noodles, rods or flakes of the solid resole-type phenolic resin are preferred.

The solid epoxy resin used in this invention is a compound, containing at least 2 epoxy groups per molecule, which is solid at normal temperature, e.g., about 20° to 30° C. Typical examples are condensation products formed between epichlorohydrin and bisphenol-type compounds.

Examples of suitable bisphenol-type compounds include 2,2'-bis(4,4'-hydroxyphenyl)propane (commonly called "bisphenol A"), halogenated bisphenol A, 2,2'-bis(4,4'-hydroxyphenyl)methane (commonly called "bisphenol F"), and novolac-type polyfunctional phenol resins obtained by condensing resorcinol, tetrahydroxyphenylethane, phenol or cresol with formaldehyde. Glycidylamines obtained from hydantoin, etc., which are mononuclear N-heterocyclic compounds having an internal cyclic —NH—group can also be employed. Bisphenol A-type diglycidyl ether-type epoxy resins are especially preferred for use in this invention. Preferably, these epoxy resins have a softening point of about 65° to about 140° C., especially 85° to 130° C. Specific commercially available examples of such epoxy resins are AER-661 (epoxy equivalent: 450 to 500; softening point: 64° to 74° C.; trademark of Asahi Chemical Ind. Co., Ltd.), AER-664 (epoxy equivalent: 900 to 1000; softening point: 96° to 110° C.; trademark of Asahi Chemical Ind. Co., Ltd.), and AER-667 (epoxy equivalent: 1750 to 2150; softening point: 122° to 132° C.; trademark of Asahi Chemical Ind. Co., Ltd.), Epikote 1004 (epoxy equivalent: 900 to 100; softening point: 95° to 110° C.; trademark of Shell Chemical Co.), and Epikote 1007 (epoxy equivalent: 1750 to 2150;

softening point: 120° to 135° C.; trademark of Shell Chemical Co.).

Generally employed curing agents for epoxy resins can also be used in the present invention. Examples of suitable curing agents are novolac-type phenolic resins (e.g., novolac-type phenolic resins having a degree of polymerization of 3 to 4 produced by reaction of phenol and formaldehyde), dicyandiamide, imidazoles (e.g., 2-methylimidazole, etc.), aromatic amines (e.g., diaminodiphenylmethane, diaminodiphenylsulfone, etc.) and acid anhydrides (e.g., tetrahydrophthalic anhydride, pyromellitic acid, phthalic anhydride, etc.). Relatively good results can be obtained by using novolac-type phenolic resins in the epoxy resin composition of this invention as a curing agent. A preferred amount of the curing agent is about 0.5 to 20 phr.

The composition of this invention can be prepared by mixing about 20 to about 80% by weight, preferably 40 to 60% by weight, of the solid epoxy resin as described above with about 80 to about 20% by weight, preferably 60 to 40% by weight, of the solid resole-type phenolic resin having the specific properties described hereinabove, and melting the mixture by heating. A suitable heating temperature for the melting is about 60° to about 150° C., preferably 90° to 110° C. At lower temperatures, it is difficult to obtain a homogeneous composition. At higher temperatures, a curing reaction proceeds to an excessive degree, and the desired advantageous properties cannot be obtained.

In the present invention, extenders, flow controlling agents, reinforcing agents, fillers, and pigments can be added to the composition. These additives may be incorporated after the composition has been pulverized, but they are preferably added to the composition at the time of melt-blending. Specific examples of these additives which can be used are glass fibers, asbestos fibers, carbon fibers, polyethylene powder, quartz powder, mineral silicate salts such as mica, asbestos powder and slate powder, kaolin, aluminum oxide, aluminum hydroxide, antimony trioxide, silica, titanium dioxide, carbon black, colored oxide pigments, such as iron oxide, metal powders, such as aluminum or iron powder, and liquid epoxy resins. These additives can be incorporated in the epoxy resin composition of the present invention in an amount up to about 50% by weight, preferably 5 to 20% by weight, based on the total weight of the solid epoxy resin and the resole-type phenolic resin present in the epoxy resin composition of this invention.

The composition of this invention which is obtained by mixing the components by melt-blending, cooling the mixture and then pulverizing the mixture is rapidly curable at a high temperature of at least about 180° C. A coated film prepared from the composition has good adhesion, good flexibility, high hardness and excellent corrosion resistance. The resistance of the film to water, acids, alkalies and to highly polar solvents, such as tetrahydrofuran, chloroform and methyl ethyl ketone, is also good.

When this composition is to be used for coating the inside and outside of a steel pipe, a coated film having very good mechanical characteristics can be formed by spraying the composition simply on a steel pipe heated to a surface temperature of about 180° to about 250° C., and then directly cooling the coated pipe.

The resin composition of this invention can be used in a wide range of applications in which curing at high temperatures is possible, for example, as a protective paint for the inner surfaces of drums and pipes, as an electrical insulating paint, as an adhesive, as a binder and as a molding material.

The following examples are given to illustrate the present invention in greater detail. Unless otherwise indicated, all parts, percents, ratios and the like are by weight.

REFERENCE EXAMPLE 1

A reactor equipped with a stirrer and a heating jacket was charged with 1,000 g of phenol, 1,019 g of a 37% aqueous solution of formaldehyde, and 30 g of a 20% aqueous solution of sodium hydroxide, and the mixture was maintained at 70° C. for about 30 minutes to perform a methylolating reaction. The mixture was then cooled to 40° C., and 100 g of a 25% ammonia aqueous solution was further added, and the reaction was again conducted at 70° C. for 2 hours to attain a viscosity of 500 cps (65° C.). The waste liquor was removed, and the condensed resin was placed in a tubular continuous dehydrating machine under reduced pressure to concentrate at 70° C. to a volatiles content of 5%. The resin was then charged into a biaxial extruder having an inside diameter of 60 mm and an L/D ratio of 11, and extruded under conditions such that the charge zone of the cylinder was at 50° C., the outlet zone at 70° C., and the residence time in each zone was adjusted to 50 seconds. The extrudate was allowed to flow out onto a cooling conveyor (20° C.) to form a solid resole-type phenolic resin.

REFERENCE EXAMPLE 2

940 g of phenol and 1,200 g of a 37% aqueous solution of formaldehyde were weighed into a reactor equipped with a cooling jacket. With cooling at 40° C., 200 g of a 25% ammonia aqueous solution was added to the reactor in three portions. The temperature was raised gradually, and the reaction was performed at 70° C. for 3 hours. The reaction mixture had a viscosity of 1,200 cps (60° C.). The reaction mixture was transferred to a concentrator equipped with a pressure reducing device, and concentrated at a reduced pressure of 60 mm Hg until the temperature became 80° C. The concentrate was poured immediately into a large quantity of water, and with rapid cooling at 20° C., the product was pulverized in water. By subsequent centrifugal filtration, a solid resin was obtained. The resin had a water content of 12%. The resin was put into a monoaxial vent extruder having an inside diameter of 90 mm and an L/D ratio of 17, and extruded under conditions such that the temperature at the charge zone was adjusted to 30° C. and the temperature at the outlet zone was adjusted to 100° C., gases generated were removed under reduced pressure from an intermediate portion of the extruder, and the residence time in each zone was adjusted to 60 seconds. The extrudate was allowed to flow out on a cooling conveyor (20° C.) to obtain a solid resole-type phenolic resin.

REFERENCE EXAMPLE 3

225 g of bisphenol A, 108 g of m-cresol and 480 g of a 37% aqueous solution of formaldehyde were weighed into a reactor equipped with a cooling jacket. With cooling at 40° C., 200 g of a 25% ammonia aqueous solution was added to the reactor in three portions. The temperature was increased gradually, and the reaction was performed at 70° C. for 3 hours. Then, the reaction mixture was treated in the same manner as in Reference Example 2 to obtain a solid resole-type phenolic resin.

REFERENCE EXAMPLE 4

In the same manner as described in Reference Example 2, pulverization in water and subsequent centrifugal filtration were performed to obtain a solid resin having a water content of 12%. The resin was directly put into a kneading reactor of the double screw type, and treated continuously at a temperature of 70° C. and then at 100° C. (the residence time was 120 seconds in each case) to form a solid resole-type phenolic resin.

REFERENCE EXAMPLE 5

1,000 g of phenol, 920 g of a 37% aqueous solution of formaldehyde, 80 g of hexamethylenetetramine and 15 g of ethylenediamine were put in a reactor, and the temperature was gradually increased to 70° C. The reaction was performed at this temperature for 3 hours. Then, 400 g of a 5% aqueous solution of carboxymethylcellulose was added to the resulting resin, and the mixture was stirred for 15 minutes at the same temperature to produce a resin in the form of spheres. After rapid cooling at 20° C., the liquid supernatant was removed. The spherical resin particles in the lower layer were dried in air to form a resole-type phenolic resin in the form of spheres with an average particle diameter of 0.5 mm.

REFERENCE EXAMPLE 6

940 g of phenol and 2,000 g of a 37% aqueous solution of formaldehyde were weighed in a reactor equipped with a cooling jacket, and 50 g of a 25% ammonia aqueous solution was added in three separate portions. The reaction mixture was worked up in the same manner as in Reference Example 2 to obtain a solid resole-type phenolic resin.

REFERENCE EXAMPLE 7

940 g of phenol and 1,200 g of a 37% aqueous solution of formaldehyde were weighed in a reactor equipped with a cooling jacket, and 200 g of a 25% ammonia aqueous solution was added thereto in three separate portions. The reaction mixture was worked up in the same manner as in Reference Example 2 to form a solid resin which was then placed in an extruder as described in Reference Example 2. The temperature of the charge zone in the extruder was maintained at 60° C., and that of the outlet zone was maintained at 120° C. The residence time in each zone was maintained at 150 seconds. Under these conditions, the resin was worked up to form a solid resole-type phenolic resin.

The characteristics of the solid resole-type phenolic resins obtained in the above Reference Examples are shown in Table 1 below.

TABLE 1

| | Reference Example No. | | | | | | |
|---|---|---|---|---|---|---|---|
| | Resins within Invention | | | Resins for Comparison | | | |
| Properties | 1 | 2 | 3 | 4 | 5 | 6 | 7 |
| Softening Point (°C.) | 77 | 85 | 85 | 110 | 91 | 67 | 78 |
| Gel Time (seconds) | 95 | 95 | 82 | 45 | 20 | 140 | 30 |
| Methylol Index | 32 | 38 | 28 | 20 | 15 | 40 | 20 |
| Water Content (wt %) | 0.9 | 0.95 | 0.6 | 0.9 | 0.25 | 1.10 | 0.50 |

EXAMPLE 1

Mixtures having the compositions shown in Table 2 below were prepared using the solid resole-type phenolic resins obtained in Reference Examples 1, 2 and 3. The mixtures were uniformly melt-mixed at a temperature of 100° to 110° C. using a kneader, and then pulverized to a powder of less than a size of 140 mesh. Each of the powder compositions was coated on degreased mild steel to a thickness of 50 to 100 microns using electrostatic coating, and then baked in an oven at each of the temperatures shown in Table 2. The properties of the cured coatings were measured and the results are shown in Table 2 below.

AER-664 and AER-667 shown in Table 2 are epoxy resins made by Asahi Chemical Ind. Co., Ltd. having an epoxy equivalent of 955 and 1950, and a softening point of 105° C. and 130° C., respectively. The numerals in the table showing the proportions are parts by weight.

TABLE 2

| | Run No. | | | | | | |
|---|---|---|---|---|---|---|---|
| | 1 | 2 | 3 | 4 | 5 | 6 | 7 |
| Composition | | | | | | | |
| AER-664 | 50 | 50 | 60 | 30 | — | 50 | 70 |
| AER-667 | — | — | — | 30 | 60 | — | — |
| Reference Example 1 Resin | 50 | — | — | — | — | — | — |
| Reference Example 2 Resin | — | 50 | 40 | 40 | 40 | 50 | — |
| Reference Example 3 Resin | — | — | — | — | — | — | 30 |
| Titanium Oxide | — | — | — | — | — | 20 | 20 |
| Flow Control Agent (*) | 0.5 | 0.5 | 0.5 | 0.5 | 0.5 | 0.5 | 0.5 |
| Cured Coating Properties Cured (180° C./10 min) | | | | | | | |
| Pencil Scratch Hardness (**) | 4H | 4H | 3H | 3H | 3H | 5H | 5H |
| Erichsen (mm) (***) | 4.3 | 4.5 | 5.1 | 5.5 | 7.6 | 4.0 | 6.5 |
| Flexural Resistance (mm) (**) | 8 | 8 | 8 | 8 | 8 | 10 | 8 |
| Du Pont Impact Strength (cm) (500 g × ½ inch) (**) | 50 | 50 | 50 | 50 | 50 | 30 | 50 |
| Crosscut Test (remainder/100) (***) | 100 | 100 | 100 | 100 | 100 | 100 | 100 |
| Appearance | Good | Good | Good | Good | Good | Good | Good |
| Chemical Resistance (****) | | | | | | | |
| 10% NaOH | No change | No change | No change | No change | No change | No change | No change |
| Methyl Ethyl Ketone | No change | No change | No change | No change | No change | No change | No change |
| Tetrahydrofuran | No change | No change | No change | No change | No change | No change | No change |

TABLE 2-continued

|  | Run No. | | | | | | |
| --- | --- | --- | --- | --- | --- | --- | --- |
|  | 1 | 2 | 3 | 4 | 5 | 6 | 7 |
| Cured Coating Properties Cured (200° C./10 min) | | | | | | | |
| Pencil Scratch Hardness (**) | 4H | 4H | 3H | 3H | 3H | 5H | 5H |
| Erichsen (mm) (**) | 4.0 | 4.0 | 5.3 | 5.0 | 6.8 | 4.2 | 6.5 |
| Crosscut Test (remainder/100) (***) | 100 | 100 | 100 | 100 | 100 | 100 | 100 |

Note
(*): MODAFLOW (a trademark for a product of Monsanto Company)
(**): JIS K-5400
(***): "Testing Methods for Paints" by Japan Association of Investigation of Industrial Standards
(****): Immersed for 1 week at 25° C.

COMPARATIVE EXAMPLE 1

Mixtures having the compositions shown in Table 3 below were prepared using the solid resole-type phenolic resins obtained in Reference Examples 4 and 5, and a coated film having a thickness of 50 to 100 microns was formed on degreased mild steel in the same manner as described in Example 1. The properties of the coated films are shown in Table 3 below.

TABLE 3

|  | Run No. | |
| --- | --- | --- |
|  | 8 | 9 |
| Composition | | |
| AER-664 | 50 | 60 |
| Reference Example 4 Resin | 50 | — |
| Reference Example 5 Resin | — | 60 |
| Flow Controlling Agent (*) | 0.5 | 0.5 |
| Cured Coating Properties Cured (180° C./10 min) | | |
| Pencil Scratch Hardness (**) | 2H | 2H |
| Erichsen (mm) (***) | 1.0 | 0.8 |
| Flexural Strength (mm) (**) | 10< | 10< |
| Du Pont Impact Strength (cm) (500 g × ½ inch) (**) | 5 | 5 |
| Crosscut Test (remainder/100) (***) | 20 | 0 |
| Appearance | Many pinholes | Many pinholes |
| Chemical Resistance (****) | | |
| 10% NaOH | Blistering occurred | Blistering occurred |
| Methyl Ethyl Ketone | Peeled | Peeled |
| Tetrahydrofuran | Peeled | Peeled |
| Cured (200° C./10 min) | | |
| Pencil Scratch Hardness (**) | H | 2H |
| Erichsen (mm) (***) | 1.3 | 0.6 |
| Crosscut Test (remainder/100) (***) | 30 | 15 |

(*) to (****) as described for Table 2.

It is seen from the results that when solid resole-type phenolic resins outside the scope of the present invention are used, the flow of the compositions at the time of forming a coated film is poor. Considerable pinholes are formed, and the properties of the coated films are poor.

EXAMPLE 2 AND COMPARATIVE EXAMPLE 2

Mixtures were prepared in accordance with the formulations shown in Table 4 below by using the solid resole-type phenolic resins obtained in Reference Examples 2, 6 and 7. The gel time at 200° C., the flowability at 200° C. and the softening points of the compositions are shown in Table 4 below. Coated films were formed from these compositions by baking at 200° C. for 20 minutes. The conditions of the coated films and their resistance to methyl ethyl ketone were determined. The results are also shown in Table 4.

TABLE 4

|  | Run No. | | | | | | |
| --- | --- | --- | --- | --- | --- | --- | --- |
|  | 10 | 11 | 12 | 13 | 14 | 15 | 16 |
| Composition | | | | | | | |
| AER-664 | 800 | 800 | 800 | 500 | 500 | 500 | 200 |
| Reference Example 2 Resin | 200 | — | — | 500 | — | — | 800 |
| Reference Example 6 Resin | — | 200 | — | — | 500 | — | — |
| Reference Example 7 Resin | — | — | 200 | — | — | 500 | — |
| TiO₂ | 400 | 400 | 400 | 400 | 400 | 400 | 400 |
| Modaflow (flow control agent) | 25 | 25 | 25 | 25 | 25 | 25 | 25 |
| Resin Properties | | | | | | | |
| Gel Time (sec/200° C.) | 150 | 210 | 115 | 75 | 108 | 45 | 67 |
| Flowability (mm/200° C.) | 215 | 270 | 155 | 115 | 152 | 85 | 102 |
| Softening Point (°C.) | 87 | 81 | 85 | 75 | 69 | 83 | 72 |
| Condition of cured Coated Film | Good | Sagging (thickness uneven) | Good | Good | Sagging (thickness uneven) | Uneven coated surface | Good |
| Resistance to Methyl Ethyl Ketone of Cured Coated Film (immersion at 20° C. for 1 month) | No change | Coated film peeled | Swelled | No change | Coated film peeled | Swelled | No Change |

COMPARATIVE EXAMPLE 3

Phenol was dissolved in a 37% aqueous formaldehyde solution and after adding it to a 25% aqueous ammonia solution (catalyst), the mixture was reacted under refluxing in a reaction vessel equipped with a reflux condenser for 1 hour at 90° C. The resin layer formed was washed with 200 g of water at 20° C. several times as shown in Table 5 and then dried for 2 hours at a temperature of lower than 50° C. under reduced pressure. Then by heating the resulting condensed resin to 95° C. for 2 hours, a solid or liquid phenolic resin was obtained. The amounts of the reactants and the catalyst, the washing conditions and the properties of the resulting phenolic resin are tabulated in Table 5.

TABLE 5

| Processing Conditions | Comparative Resin | | | |
|---|---|---|---|---|
| | 1 | 2 | 3 | 4 |
| Phenol (g) | 94 | 94 | 94 | 94 |
| 37% Formaldehyde Solution (g) | 69 | 77 | 69 | 77 |
| 25% Ammonia Solution (g) | 6 | 7 | 6 | 6 |
| Molar Ratio of Phenol/Formaldehyde | 1/0.8 | 1/0.95 | 1/0.8 | 1/0.95 |
| Content of Ammonia in Reaction System (%) | 1 | 1 | 1 | 1 |
| Condensation Reaction | 90° C./1 hour | 90° C./1 hour | 90° C./1 hour | 90° C./1 hour |
| Washing Condition (*) | 200g water/ 20° C. once (1.8) | 200g water/ 20° C. once (1.8) | None (—) | 200g water/ 20° C. 10 times (18) |
| Properties | | | | |
| Resulting Phenolic Resin | Solid | Solid | Liquid | Solid |
| Methylol Index | 18 | 20 | 33 | 13 |

*:Weight ratio of the amount of water used to the amount of the condensation product.

Mixtures having the compositions shown in Table 6 below were prepared and processed in the same manner as in Example 1 to obtain cured coatings. The properties of the cured coatings were measured and the results are shown in Table 6 with the results obtained in Example 1 Run No. 1.

TABLE 6

| | Run No. | | | | |
|---|---|---|---|---|---|
| | 1 | 17 | 18 | 19 | 20 |
| Composition | | | | | |
| AER-664 | 50 | 50 | 50 | 50 | 50 |
| Reference Example 1 Resin | 50 | — | — | — | — |
| Comparative Resin 1 | — | 50 | — | — | — |
| Comparative Resin 2 | — | — | 50 | — | — |
| Comparative Resin 3 | — | — | — | 50 | — |
| Comparative Resin 4 | — | — | — | — | 50 |
| Flow Control Agent (*) | 0.5 | 0.5 | 0.5 | 0.5 | 0.5 |

TABLE 6-continued

| | Run No. | | | | |
|---|---|---|---|---|---|
| | 1 | 17 | 18 | 19 | 20 |
| mainder/100) (***) | | | | | |

| Cured Coating Properties Cured (200° C./10 min) | | | | | |
|---|---|---|---|---|---|
| Pencil Scratch Hardness (**) | 4H | 2H | 2H | 4H | 2H |
| Erichsen (mm) (**) | 4.0 | 1.5 | 2.3 | 0.8 | 1.5 |
| Crosscut Test Re- | 100 | 0 | 20 | 30 | 0 |

REFERENCE EXAMPLE 8-11

In the same manner as in Reference Example 1, phenol, a 37% aqueous solution of formaldehyde and a 25% ammonia aqueous solution were charged in amounts shown in Table 7 in a reactor and reacted at 70° C. or 90° C. for 1 hour. The waste liquor was removed and the condensed resin was placed in a tubular continuous dehydrating machine under reduced pressure at 50° C. for 4 hours. The resin was then charged into a biaxial extruder having an inside diameter of 60 mm and an L/D ratio of 11 and extruded in the same manner as in Reference Example 1. The extrudate was allowed to flow out onto a cooling conveyor (20° C.) to form solid resole-type phenolic resins. The amounts of the reactants and the catalyst, the processing conditions and the properties of the resulting solid resole-type phenolic resins are tabulated in Table 7.

TABLE 7

| Processing Conditions | Reference Example | | | |
|---|---|---|---|---|
| | 8 | 9 | 10 | 11 |
| Phenol (g) | 1,000 | 1,000 | 1,000 | 1,000 |
| 37% Formaldehyde Solution (g) | 1,400 | 1,100 | 1,100 | 4,000 |
| 25% Ammonia Solution (g) | 10 | 10 | 10 | 10 |
| Condensation Reaction | 70° C./1 hour | 90° C./1 hour | 90° C./1 hour | 70° C./1 hour |
| Washing with water | None | None | None | None |
| Properties | | | | |
| Softening Point (°C.) | 70 | 90 | 87 | 72 |
| Gel Time (second) at 150° C. | 90 | 108 | 110 | 81 |
| Methylol Index | 32 | 27 | 25 | 45 |

EXAMPLE 3

Mixtures were prepared in accordance with the formulations sshown in Table 8 below using the solid resole-type phenolic resins obtained in Reference Examples 8 to 11. Coated films were formed from these compositions in the same manner as in Example 1. The conditions of the coated films and their resistance to methyl ethyl ketone were determined and the results are shown in Table 8.

TABLE 8

| | Run No. | | | |
|---|---|---|---|---|
| | 21 | 22 | 23 | 24 |
| Composition | | | | |
| AER-664 | 500 | 500 | 500 | 500 |
| Reference Example 8 resin | 500 | — | — | — |
| Reference Example 9 resin | — | 500 | — | — |
| Reference Example 10 resin | — | — | 500 | — |
| Reference Example 11 resin | — | — | — | 500 |
| Condition of Cured Coated Film | Good | Good | Good | Good |
| Resistance to Methyl Ethyl Ketone of Cured Coated Film (immersion at 20° C. for 1 month) | No change | No change | No change | No change |

It can be seen from the results that when solid resole-type phenolic resins outside the scope of the invention are used, the surface conditions and methyl ethyl ketone resistance of the coated films are poor.

As described hereinabove, since in the composition of this invention, the softening point of the solid resole-type phenolic resin is within the range of 70° to 90° C., the resole-type phenolic resin is easy to knead with a solid epoxy resin. Furthermore, since the gel time thereof is as long as at least 80 seconds at 150° C., the resole-type phenolic resin can impart good flow characteristics. Hence, good quality coatings can be formed.

Furthermore, the composition of this invention is rapidly curable making curing possible in about 10 minutes at 180° C. Furthermore, the composition of this invention provides good quality coated films having a high degree of cross-linking, and superior corrosion resistance, adhesiveness and flexibility.

While the invention has been described in detail and with reference to specific embodiments thereof, it will be apparent to one skilled in the art that various changes and modifications can be made therein without departing from the spirit and scope thereof.

What is claimed is:

1. A powder paint comprising
   (1) about 20 to about 80% by weight of a solid epoxy resin, and
   (2) about 80 to about 20% by weight of a solid resole-type phenolic resin having a softening point of about 70° to about 90° C., a gel time at 150° C. of at least about 80 seconds and a methylol index of about 25 to about 45, said phenolic resin being a condensation product of 1 mol of a phenol with 1 to about 4 mols of an aldehyde.

2. The paint of claim 1, wherein the solid epoxy resin has a softening point of 65° to 140° C.

3. The paint of claim 1, wherein the solid epoxy resin is a bisphenol A-type epoxy resin.

4. The paint of claim 3, wherein the epoxy resin has a softening point of 65° to 140° C.

5. The paint of claim 1, wherein the solid resole-type phenolic resin is a phenol-formaldehyde resole resin.

6. The paint of claim 1, wherein the solid resole-type phenolic resin is a cresol-formaldehyde resole resin.

7. The paint of claim 1, wherein the solid resole-type phenolic resn is a bisphenol A-formaldehyde resole resin.

8. The paint of claims 5 or 6, wherein the solid resole-type phenolic resin is obtained by using ammonia solution as a basic catalyst for condensation.

9. The paint of claims 5 or 6, wherein the solid resole-type phenolic resin is obtained by using a primary or secondary amine as a basic catalyst for condensation.

10. The paint of claim 1, wherein said phenolic resin is a condensation product of 1 mol of a phenol with 1.2 mol to 2 mols of an aldehyde.

11. The paint of claim 1 substantially free of solvent.

12. The paint of claim 1 consisting essentially of said solid epoxy resin and said solid resole-type phenolic resin as a vehicle.

13. The paint of claim 1 obtained by uniformly melt-mixing said solid epoxy resin and said solid resole-type phenolic resin and then pulverizing the resulting product to powder form.

14. The paint of claim 1 consisting essentially of said solid epoxy resin, said solid resole-type phenolic resin and one or more members selected from the group consisting of extenders, flow controlling agents, reinforcing agents, fillers and pigments.

15. A process for producing a coated film which comprises coating a powder paint as set forth in claim 1 on a substrate without using a solvent and heating the thus coated powder paint to yield said coated film.

16. The paint of claim 1, wherein said gel time at 150° C. is about 100 seconds.

17. The paint of claim 1, wherein said gel time at 150° C. is about 150 seconds.

18. The paint of claim 1, wherein said gel time at 150° C. is about 500 seconds.

19. The paint of claim 1, wherein said phenol is a phenol substituted with an alkyl group having 1 to 6 carbon atoms.

20. The paint of claim 1, wherein said solid epoxy resin contains at least 2 epoxy groups per molecule and is solid at a temperature between 20° and 30° C.

21. The paint of claim 1, wherein said solid epoxy resin is contained in an amount of about 40 to 60% by weight and said solid resole-type phenolic resin is contained in an amount of about 60 to 40% by weight.

22. The paint of claim 1 obtained by melt-blending said solid epoxy resin and said solid resole-type phenolic resin, said phenolic resin being produced by reacting 1 mole of phenol with 1 to 4 moles of aldehyde, condensing the reaction product to a volatiles content of about 2 to about 15% by weight at 70° C. and subsequently maintaining the same at room temperature to about 50° C. for 10 to 60 seconds and then at about 50° to about 130° C. for 10 to 60 seconds.

* * * * *